US008468524B2

(12) United States Patent
Velayudhan et al.

(10) Patent No.: US 8,468,524 B2
(45) Date of Patent: Jun. 18, 2013

(54) INTER-VIRTUAL MACHINE TIME PROFILING OF I/O TRANSACTIONS

(75) Inventors: Vinu Velayudhan, Fremont, CA (US); Varadaraj Talamacki, Fremont, CA (US); Senthil Thangaraj, Fremont, CA (US); Sumant Kumar Patro, Fremont, CA (US)

(73) Assignee: LSI Corporation, San Jose, CA (US)

( * ) Notice: Subject to any disclaimer, the term of this patent is extended or adjusted under 35 U.S.C. 154(b) by 232 days.

(21) Appl. No.: 12/903,846

(22) Filed: Oct. 13, 2010

(65) Prior Publication Data
US 2012/0096205 A1    Apr. 19, 2012

(51) Int. Cl.
*G06F 9/455*    (2006.01)
(52) U.S. Cl.
CPC .................................. *G06F 9/45533* (2013.01)
USPC ............................................... 718/1; 710/260
(58) Field of Classification Search
None
See application file for complete search history.

(56) References Cited

U.S. PATENT DOCUMENTS

| | | | |
|---|---|---|---|
| 7,299,468 B2 * | 11/2007 | Casey et al. ................... 718/104 |
| 7,328,437 B2 * | 2/2008 | Donovan et al. ................... 718/1 |
| 7,668,177 B1 * | 2/2010 | Trapp et al. ............. 370/395.42 |
| 7,784,053 B2 * | 8/2010 | Casey et al. ................... 718/104 |
| 7,831,977 B2 * | 11/2010 | Shultz et al. ................... 718/104 |
| 7,840,962 B2 * | 11/2010 | Neiger et al. ...................... 718/1 |
| 7,895,597 B2 * | 2/2011 | Hartikainen ................... 718/108 |
| 7,913,009 B2 * | 3/2011 | Vega et al. ................... 710/106 |
| 7,917,677 B2 * | 3/2011 | Johnson et al. ............... 710/260 |
| 7,917,903 B2 * | 3/2011 | Lumb et al. ................... 718/100 |
| 8,146,078 B2 * | 3/2012 | Bennett et al. ...................... 718/1 |
| 8,151,265 B2 * | 4/2012 | Ben-Yehuda et al. ............ 718/1 |
| 8,209,681 B1 * | 6/2012 | Turner et al. ...................... 718/1 |
| 2002/0161961 A1 * | 10/2002 | Hardin et al. ...................... 711/6 |
| 2003/0101440 A1 * | 5/2003 | Hardin et al. ................. 717/148 |
| 2004/0194095 A1 * | 9/2004 | Lumb et al. ................... 718/100 |
| 2004/0268348 A1 * | 12/2004 | Waki et al. ......................... 718/1 |
| 2007/0079022 A1 * | 4/2007 | Carlson et al. .................. 710/48 |
| 2008/0104589 A1 * | 5/2008 | McCrory et al. .................. 718/1 |
| 2008/0222632 A1 * | 9/2008 | Ueno et al. ........................ 718/1 |
| 2009/0319256 A1 * | 12/2009 | Chow et al. ...................... 703/26 |
| 2009/0320009 A1 * | 12/2009 | Chow et al. ................... 717/154 |
| 2010/0077394 A1 * | 3/2010 | Wang et al. ....................... 718/1 |
| 2010/0082321 A1 * | 4/2010 | Cherkasova et al. ............ 703/22 |
| 2010/0082855 A1 * | 4/2010 | Accapadi et al. ............... 710/39 |
| 2010/0082995 A1 * | 4/2010 | Dees et al. ..................... 713/178 |
| 2010/0162242 A1 * | 6/2010 | Grouzdev ......................... 718/1 |
| 2010/0235557 A1 * | 9/2010 | Guo et al. ..................... 710/260 |
| 2010/0299673 A1 * | 11/2010 | Shultz et al. .................. 718/104 |
| 2011/0113208 A1 * | 5/2011 | Jouppi et al. .................. 711/162 |

(Continued)

OTHER PUBLICATIONS

Understanding the Linux Kernel, Bovet and Cesati, O'Reilly Media; Third Edition edition (Nov. 2005).*

*Primary Examiner* — Emerson Puente
*Assistant Examiner* — Mehran Kamran
(74) *Attorney, Agent, or Firm* — Alexander J. Neudeck; Cochran Freund & Young LLC (57) ABSTRACT

Disclosed is a virtual machine system where hardware timer interrupts are processed by a first virtual machine. The first virtual machine writes a timer value to a shared memory location while processing the hardware timer interrupt. The timer value may be based on a kernel timing parameter maintained by the operating system of the first virtual machine. A second virtual machine may read the shared timer value from the shared memory location in order to time inter-virtual machine processes such as I/O processing and I/O requests.

12 Claims, 6 Drawing Sheets

U.S. PATENT DOCUMENTS

2011/0131335 A1* 6/2011 Spaltro et al. .............. 709/228
2011/0197191 A1* 8/2011 Malloy et al. .............. 718/1
2012/0042061 A1* 2/2012 Ayala et al. .............. 709/224
2012/0084780 A1* 4/2012 Pasternak .............. 718/100
2012/0087319 A1* 4/2012 Raleigh et al. .............. 370/329

* cited by examiner

INTER-VIRTUAL MACHINE TIME PROFILING OF I/O TRANSACTIONS

BACKGROUND OF THE INVENTION

Virtual machines allow multiple operating systems to be run simultaneously on the same computer hardware. This allows the sharing of the underlying physical machine resources (e.g., memory, I/O, etc.) between multiple operating systems (or instances of the same operating system). Virtual machines facilitate application provisioning, maintenance, high availability, and disaster recovery. The software layer providing the virtualization is typically called a virtual machine monitor or hypervisor. A hypervisor may run on bare hardware, or on top of an operating system.

SUMMARY OF THE INVENTION

An embodiment of the invention may therefore comprise a method of providing a common timing reference value, comprising: in response to a timer hardware interrupt processed by a first virtual machine, writing a timer value to a shared memory location, the timer value based on a kernel timing parameter maintained by an operating system of said first virtual machine; and, reading, by a second virtual machine, said shared timer value from said shared memory location.

An embodiment of the invention may therefore further comprise a method of profiling the timing of an I/O request, comprising: reading, by a first virtual machine, a shared memory location containing a first timer value written by a second virtual machine; embedding said first timer value in an I/O request sent to a hypervisor, said I/O request causing an event to be processed by a second virtual machine; and, writing, by said second virtual machine, a second timer value in response to a hardware timer interrupt.

An embodiment of the invention may therefore further comprise a computer readable medium having instructions stored thereon for profiling an I/O transaction that, when executed by a computer, at least instruct the computer to: store a plurality of kernel timing parameter values maintained by a first virtual machine into a shared memory location; read, by a second virtual machine, a first of said plurality of kernel timing parameters associated with said I/O transaction; read, by a hypervisor, a second of said plurality of kernel timing parameters associated with said I/O transaction; and, read, by said first virtual machine, a third of said plurality of kernel timing parameters associated with said I/O transaction.

DETAILED DESCRIPTION OF THE EMBODIMENTS

Figure 1:
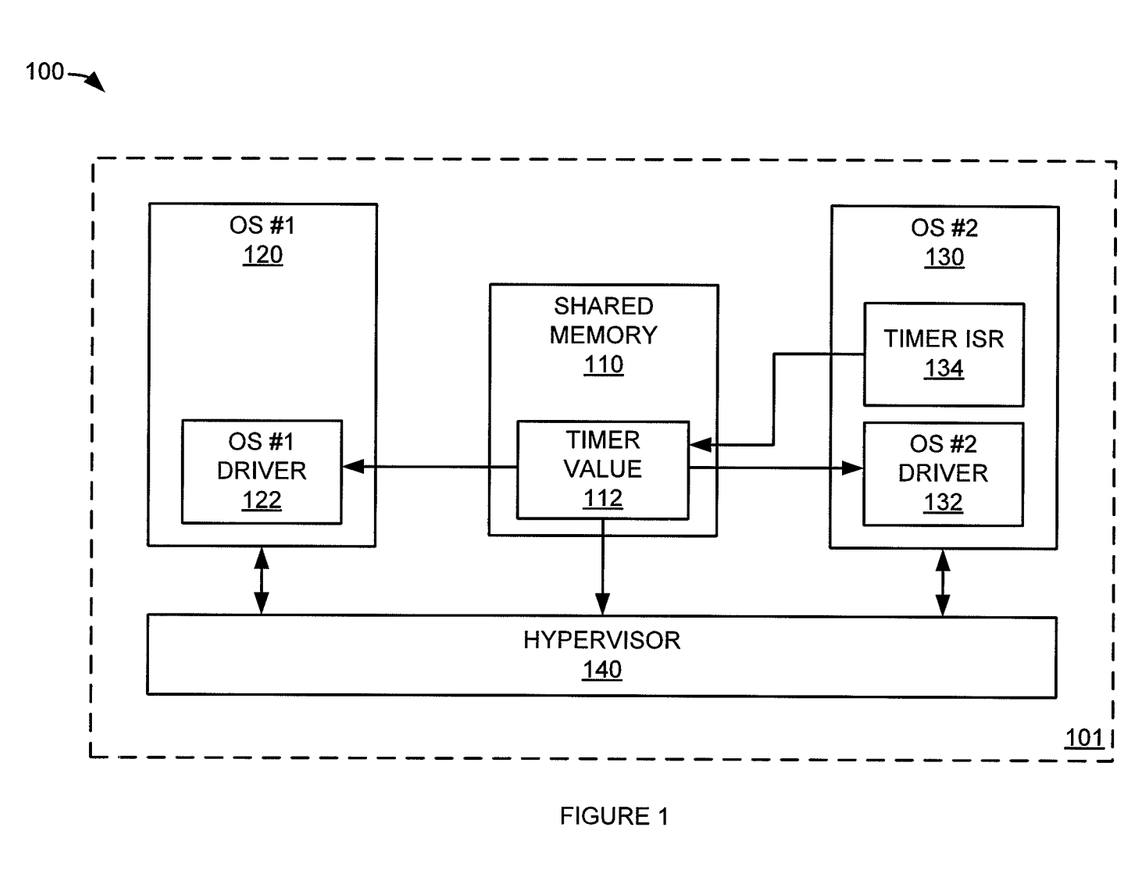
FIG. 1 is a block diagram of multiple virtual machines running on a computer.

FIG. 1 is a block diagram of multiple virtual machines running on a computer. In FIG. 1, virtual machine system 100 comprises software running on computer 101. Computer 101 includes shared memory 110. Shared memory 110 stores a timer value 112. Software running on computer 100 comprises operating system #1 (OS #1) 120, operating system #2 (OS #2) 130, and hypervisor 140. OS #1 120 includes I/O driver 122. OS #2 130 includes I/O driver 132 and timer interrupt service routine (timer ISR) 134. Shared memory 110 may be an area of computer 101's memory which is accessible from both OS #1 120 and OS #2 130.

Hypervisor 140 is operatively coupled to OS #1 120 and OS #2 130. OS #1 driver 122 and OS #2 driver 132 are operatively coupled to receive timer value 112 from shared memory 112. Because OS #1 driver 122 and OS #2 driver 132 are part of OS #1 120 and OS #2 130, respectively, OS #1 120 and OS #2 130 are also operatively coupled to receive (or read) timer value 112 from shared memory 110. Timer ISR 134 is operatively coupled to send (or write) a timer value 112 to shared memory 110. Because OS #2 driver 132 is part of OS #2 130, OS #2 130 is also operatively coupled to send (or write) timer value 112 to shared memory 110.

In an embodiment, OS #1 120 and OS #2 130 are running as virtual machines under the supervision of hypervisor 140. OS #1 120 and OS #2 130 may be any guest operating systems compatible with hypervisor 140. For example, OS #1 120 and/or OS #2 130 may be Windows, Apple, UNIX, Linux, or FreeBSD based operating systems. In an embodiment, OS #2 driver 132 may implement RAID functionality.

OS #2 130 may be configured to respond to I/O requests sent by OS #1 120 via hypervisor 140. Computer 101 generates hardware timer interrupts that are processed by timer ISR 134 of OS #2 130. When timer ISR 134 processes a hardware timer interrupt, it may from time-to-time (or each time) write a new timer value 112 to shared memory 110. This timer value may be based on a kernel timing parameter maintained by OS #2 130.

In an embodiment, OS #1 120 (or OS #1 driver 122) may read shared memory 110 to obtain timer value 112. OS #1 120 may read timer value 112 before it dispatches an I/O request to hypervisor 140. OS #1 120 may also read timer value 112 after it receives a response from OS #2 130 associated with the I/O request. By comparing or subtrancting the second timer value 112 with a previous timer value 112, OS #1 120 may determine an elapsed time. This elapsed time may correspond a processing time for the I/O request. Likewise, hypervisor 140, OS #2 130, or any application, driver, or debug routine running on computer 101 may read timer value 112 in order to time or profile the processing of I/O requests.

Figure 2:
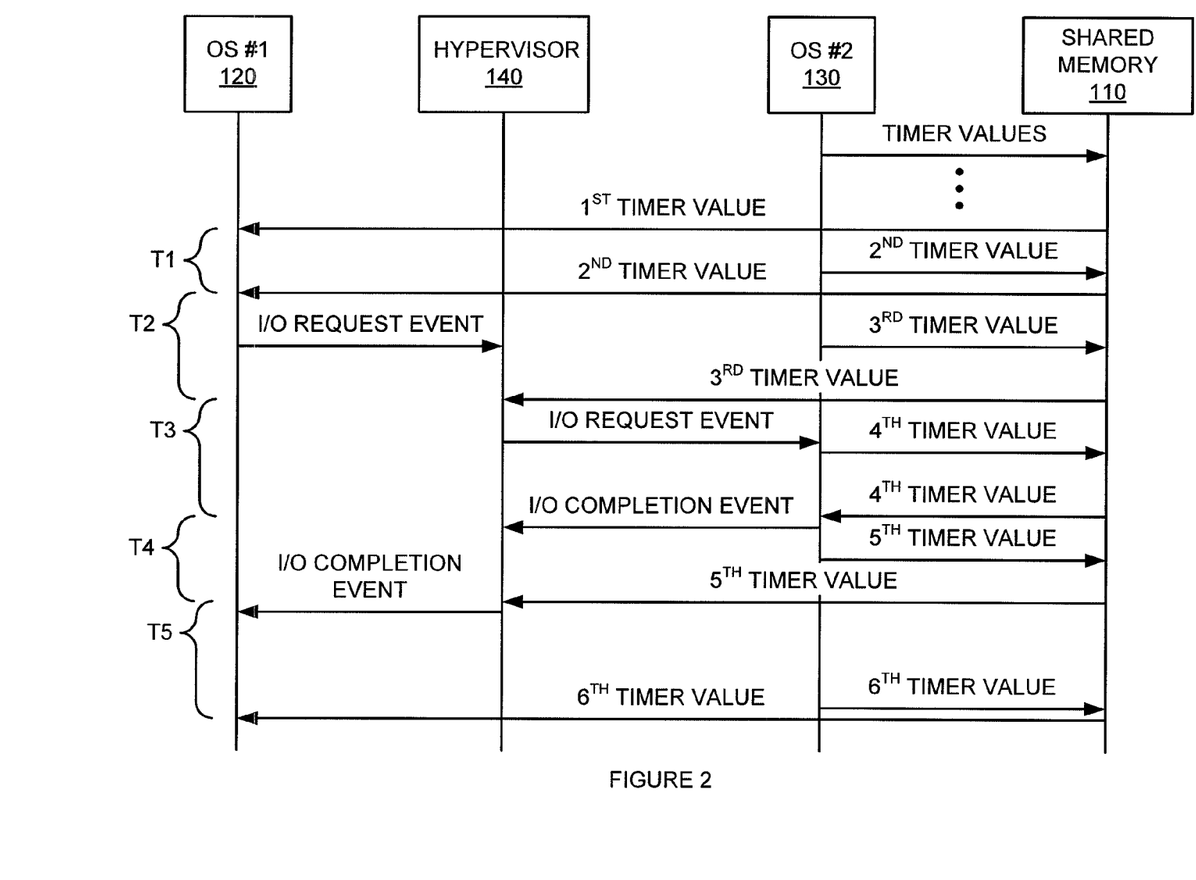
FIG. 2 is a flow diagram of providing a common timing reference.

FIG. 2 is a flow diagram of providing a common timing reference. In FIG. 2, OS #2 130 periodically writes a timer value 112 to shared memory 110. When OS #1 120 is ready to make an I/O request (e.g., by generating an I/O request event), OS #1 120 reads a $1^{st}$ timer value from shared memory 110. OS #1 120 may store the $1^{st}$ timer value. OS #1 120, and OS #1 driver 122 in particular, then process the I/O request and generates a hypervisor I/O request event. During this process, OS #2 130 writes a $2^{nd}$ timer value to shared memory 110. Before sending the hypervisor I/O request, OS #2 130 may read the $2^{nd}$ timer value from shared memory 110. OS #1 120 may store the $2^{nd}$ timer value before sending the I/O request event to hypervisor 140. As an alternative, OS #1 120 may embed the $2^{nd}$ timer value in the I/O request event.

At some point after OS #1 120 read the $2^{nd}$ timer value, OS #2 130 may write a $3^{rd}$ timer value to shared memory 110. In response to the I/O request event, hypervisor 140 may read the $3^{rd}$ timer value from shared memory 110. Hypervisor 140 may store this $3^{rd}$ timer value. Also in response to the I/O request event, hypervisor 140 may send an I/O request event to OS #2 130. Hypervisor 140 may embed the 3$^{rd}$ timer value in the I/O request.

At some point after hypervisor 140 read the 3$^{rd}$ timer value, OS #2 130 may write a 4$^{th}$ timer value to shared memory 110. In response to the I/O request event, OS #2 130 may read the 4$^{th}$ timer value from shared memory 110. OS #2 130 may store this 4$^{th}$ timer value. Also in response to the I/O request event, OS #2 130 may send an I/O completion event to hypervisor 140. OS #2 130 may embed the 4$^{th}$ timer value in the I/O completion event.

At some point after OS #2 130 read the 4$^{th}$ timer value, OS #2 130 may write a 5$^{th}$ timer value to shared memory 110. In response to the I/O completion event, hypervisor 140 may read the 5$^{th}$ timer value from shared memory 110. Hypervisor 140 may store this 5$^{th}$ timer value. Also in response to the I/O completion event, hypervisor 140 may send an I/O completion event to OS #1 120. Hypervisor 140 may embed the 5$^{th}$ timer value in the I/O completion event.

At some point after hypervisor 140 read the 5$^{th}$ timer value, OS #2 130 may write a 6$^{th}$ timer value to shared memory 110. In response to the I/O completion event, OS #1 120 may read the 6$^{th}$ timer value from shared memory 110. OS #1 120, OS #2 130, and/or hypervisor 140 may compare (or subtract) any of the 1$^{st}$-6$^{th}$ timer values with any of the other timer values to determine an elapsed time (or delay) associated with the processing etc. of the I/O request event and/or the I/O completion event. This information can be used to profile execution times and/or performance of OS #1 120, OS #1 driver 122, OS #2 130, OS #2 driver 132, and/or hypervisor 140.

Figure 3:
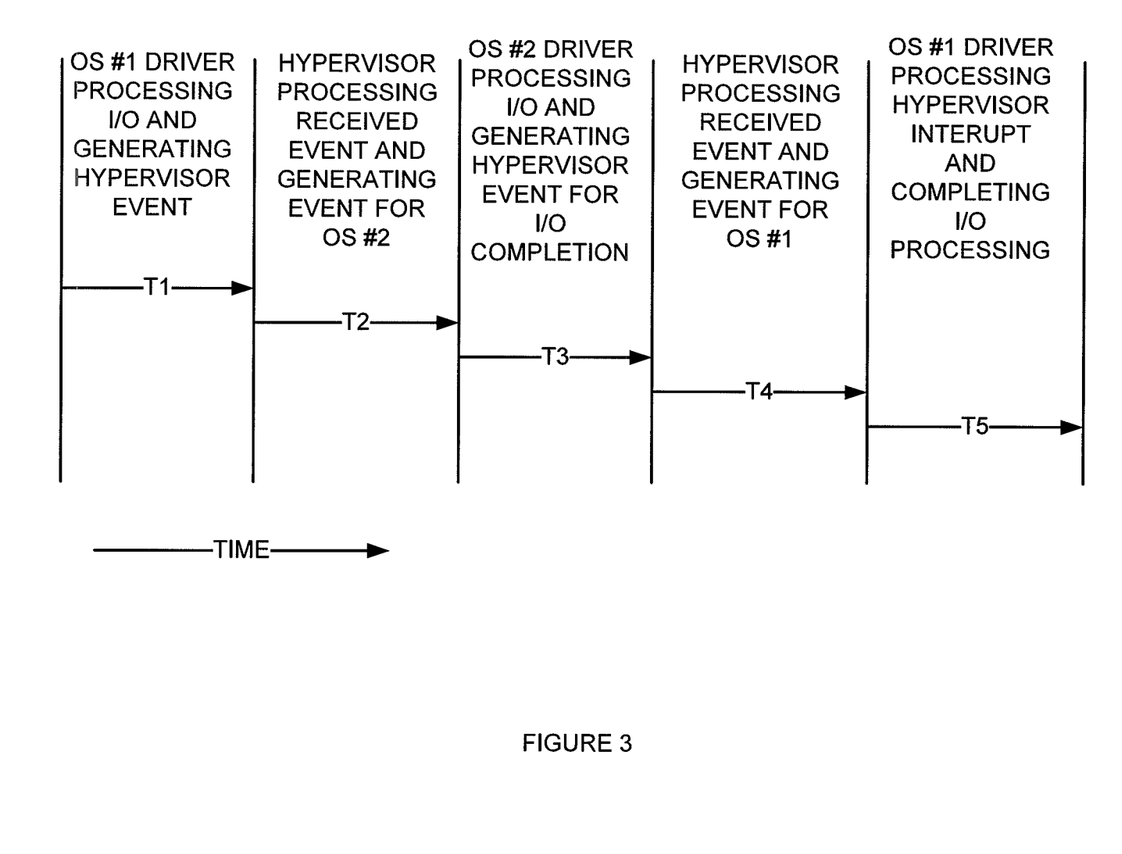
FIG. 3 is a diagram of I/O delays associated with multiple virtual machines.

FIG. 3 is a diagram of I/O delays associated with multiple virtual machines. FIG. 3 illustrates the delays T1-T5 shown in FIG. 2. T1 is a first delay associated with OS #1 120 and OS #1 driver 122 processing an I/O request and generating a hypervisor I/O request event. T1 may correspond to the difference between the 1$^{st}$ time value and the 2$^{nd}$ time value discussed previously. T2 is a second delay associated with hypervisor 140 receiving the hypervisor I/O request event and generating an I/O request event for OS #2 130. T2 may correspond to the difference between the 2$^{nd}$ time value and the 3$^{rd}$ time value.

T3 is a third delay associated with OS #2 130, and OS #2 driver 132 in particular, processing the I/O request, performing the requested actions, and generating a hypervisor completion event. T3 may correspond to the difference between the 3$^{rd}$ time value and the 4$^{th}$ time value. T4 is a fourth delay associated with hypervisor 140 receiving the I/O completion event and generating an I/O completion event for OS #1 120. T4 may correspond to the difference between the 4$^{th}$ time value and the 5$^{th}$ time value. T5 is a fifth delay associated with OS #1 120, and OS #1 driver 122 in particular, processing the hypervisor I/O completion event (interrupt) and completing I/O processing. T5 may correspond to the difference between the 5$^{th}$ time value and the 6$^{th}$ time value.

Figure 4:
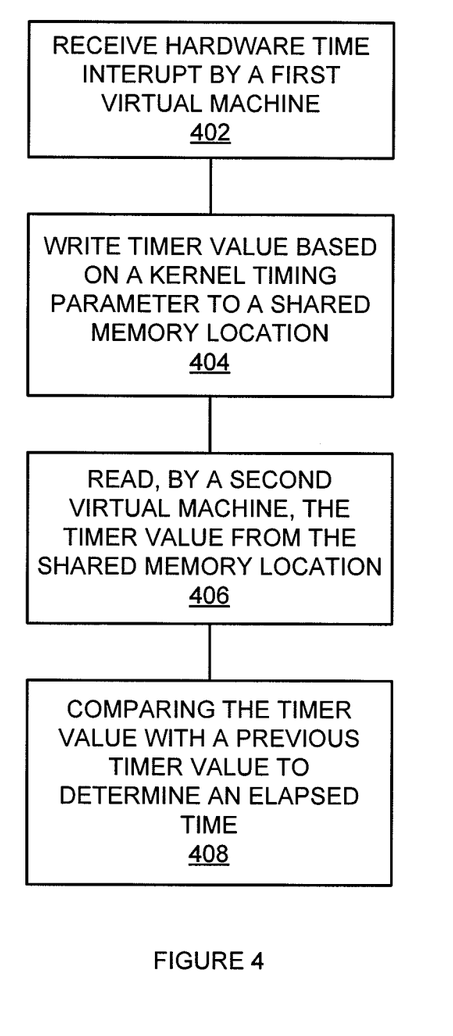
FIG. 4 is a flowchart of a method of providing a common timing reference value.

FIG. 4 is a flowchart of a method of providing a common timing reference value. The step illustrated in FIG. 4 may be performed by one or more elements of virtual machine system 100. A hardware time interrupt is received by a first virtual machine (402). For example, OS #2 130 timer ISR 134 may be called in response to a hardware timer interrupt. A timer value is written to a shared memory location (404). The timer value may be based on a kernel timing parameter. For example, timer ISR 134 may write a kernel timing parameter, such as ticks, to shared memory 110. A second virtual machine reads the timer value from the shared memory location (406). For example, OS #1 120 may read the timer value stored by OS #2 130's timer ISR 134 from shared memory 110. The timer value is compared with a previous timer value to determine and elapsed time (408). For example, an application running on OS #1 120, or OS #2 130, may compare timer values stored by OS #2 130's timer ISR 134 to each other (or subtract them) in order to determine an elapsed time. Examples of elapsed times that may be determined from the values read from shared memory 110, which represent delays across multiple virtual machines and the hypervisor 140, are delays T1-T5 discussed previously.

Figure 5:
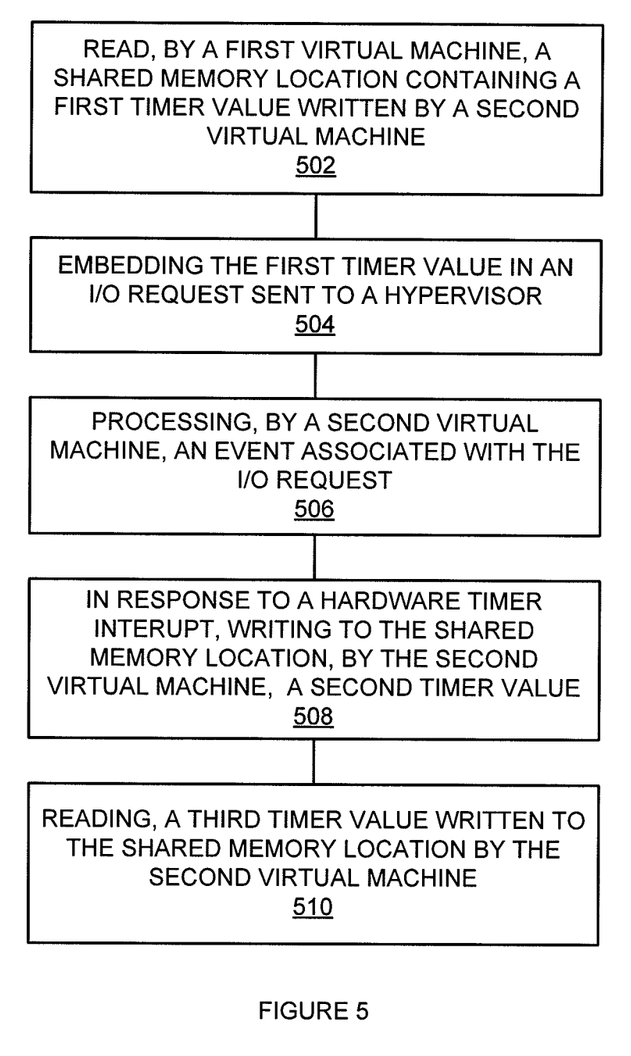
FIG. 5 is a flowchart of a method of profiling the timing of an I/O request.

FIG. 5 is a flowchart of a method of profiling the timing of an I/O request. The steps illustrated in FIG. 5 may be performed by one or more elements of virtual machine system 100. A first virtual machine reads a shared memory location containing a first timer value written by a second virtual machine (502). For example, OS #1 120 may read timer value 112 from shared memory 110 after it was written by timer ISR 134 of OS #2 130. The first timer value may be optionally embedded in an I/O request sent to a hypervisor (504). For example, the timer value 112 read by OS #1 120 may be embedded in a field of an I/O request OS #1 120 sends to hypervisor 140.

A second virtual machine processes an event associated with the I/O request (506). For example, OS #2 130 may process an interrupt or I/O event from hypervisor 140 that hypervisor 140 generated in response to the I/O request sent in block 504. In response to a hardware timer interrupt, the second virtual machine writes a second timer value to the shared memory location (508). For example, timer ISR 134 of OS #2 130 may be called in response to a hardware timer interrupt from computer 101. After being called, timer ISR 134 may write a new timer value 112 to shared memory 110. This new timer value may be based on a kernel timing parameter.

A third timer value written to the shared memory location by the second virtual machine may be read (510). For example, OS #1 120, OS #2 130, hypervisor 140, or some other application running on computer 101 may read timer value 112 from shared memory 110. As timer value 112 is constantly being updated by OS #2 130's timer ISR 134, the third value may be different that the first and second timer values, above.

The systems, software, operating systems, hypervisors, and functions described above may be implemented with or executed by one or more computer systems. The methods described above may be stored on a computer readable medium. Many of the elements of virtual machine system 100 may be, comprise, or include computers systems. This includes, but is not limited to computer 101.

Figure 6:
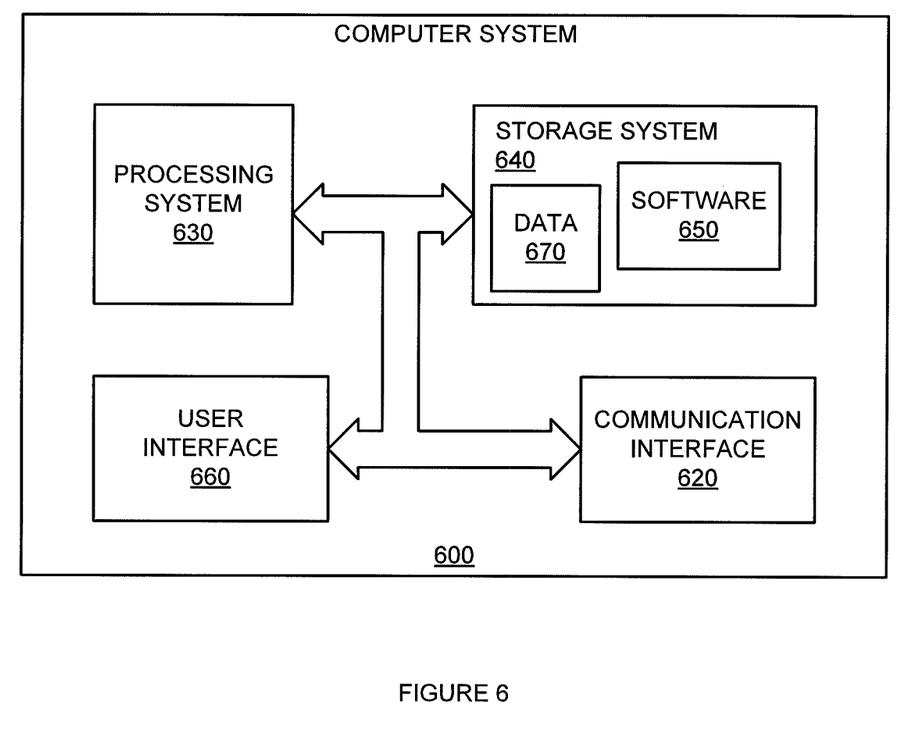
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system may retrieve and store data 670. Processing system may also retrieve and store data via communication interface 620. Processing system 650 may create or modify software 650 or data 670 to achieve a tangible result. Processing system may control communication interface 620 or user interface 670 to achieve a tangible result. Processing system may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing a common timing reference value, comprising:
    in response to a timer hardware interrupt processed by a first virtual machine, writing a timer value to a shared memory location, said timer value based on a kernel timing parameter maintained by an operating system of said first virtual machine;
    reading, by a second virtual machine, said shared timer value from said shared memory location; and,
    comparing, by said second virtual machine, said shared timer value from said shared memory location with a previous value of said shared timer value from said shared memory location to determine an elapsed time, said previous value of said shared timer value is provided to said second virtual machine as part of an I/O request and said elapsed time corresponding to a processing time for the I/O request.

2. The method of claim 1, wherein said previous value of said shared timer value is provided to said second virtual machine as part of a header of the I/O request.

3. The method of claim 1, wherein said kernel timing parameter is a kernel ticks value.

4. A method of profiling the timing of an I/O request, comprising:
    reading, by a first virtual machine, a shared memory location containing a first timer value written by a second virtual machine;
    embedding said first timer value in an I/O request sent to a hypervisor, said I/O request causing an event to be processed by a second virtual machine;
    writing, by said second virtual machine, a second timer value in response to a hardware timer interrupt; and,
    comparing, by said second virtual machine, said first timer value from said I/O request with said second timer value from said shared memory location to determine an elapsed time, said elapsed time corresponding to a processing time for the I/O request.

5. The method of claim 4, further comprising:
    reading, by a said hypervisor, said shared memory location containing a third timer value written by said second virtual machine.

6. The method of claim 5, further comprising:
    in response to receiving a response to said I/O request from said second virtual machine, reading, by said first virtual machine, said shared memory location containing a third timer value written by said second virtual machine.

7. A non-transitory computer readable medium having instructions stored thereon for profiling an I/O transaction that, when executed by a computer, at least instruct the computer to:
    store a plurality of kernel timing parameter values maintained by a first virtual machine into a shared memory location;
    read, by a second virtual machine, a first of said plurality of kernel timing parameters associated with said I/O transaction;
    read, by a hypervisor, a second of said plurality of kernel timing parameters associated with said I/O transaction;
    read, by said first virtual machine, a third of said plurality of kernel timing parameters associated with said I/O transaction; and,
    determine a delay associated with said hypervisor based on said first of said plurality of kernel timing parameters and said second of said plurality of kernel timing parameters, said delay associated with said hypervisor and corresponding to a processing time by said hypervisor for the I/O request.

8. The computer readable medium of claim 7, wherein the computer is further instructed to:
    read, by said first virtual machine, a fourth of said plurality of kernel timing parameters associated with a response to said I/O transaction.

9. The computer readable medium of claim 8, wherein the computer is further instructed to:
    read, by said hypervisor, a fifth of said plurality of kernel timing parameters associated with said response to said I/O transaction.

10. The computer readable medium of claim 9, wherein the computer is further instructed to:
    read, by said second virtual machine, a sixth of said plurality of kernel timing parameters associated with said response to said I/O transaction.

11. The computer readable medium of claim 7, wherein the computer is further instructed to:
    determine a delay associated with said hypervisor based on said first of said plurality of kernel timing parameters and said third of said plurality of kernel timing parameters.

12. The computer readable medium of claim 9, wherein the computer is further instructed to:
   determine a delay associated with said first virtual machine based on said fourth of said plurality of kernel timing parameters and said fifth of said plurality of kernel timing parameters.

* * * * *